(No Model.)

F. M. CROMER.
TIRE TIGHTENER.

No. 564,007. Patented July 14, 1896.

Witnesses
G. M. Gridley
Chas. I. Welch

Inventor
Franklin M. Cromer
By his Attorney

UNITED STATES PATENT OFFICE.

FRANKLIN M. CROMER, OF TROY, OHIO.

TIRE-TIGHTENER.

SPECIFICATION forming part of Letters Patent No. 564,007, dated July 14, 1896.

Application filed September 16, 1895. Serial No. 562,623. (No model.)

*To all whom it may concern:*

Be it known that I, FRANKLIN M. CROMER, a citizen of the United States, residing at Troy, in the county of Miami and State of Ohio, have invented certain new and useful Improvements in Tire-Tighteners, of which the following is a specification.

My invention relates to improvements in devices for securing and tightening tires on vehicle-wheels; and it consists in the constructions and combinations of parts hereinafter described, and specified in the claims.

Figure 1:
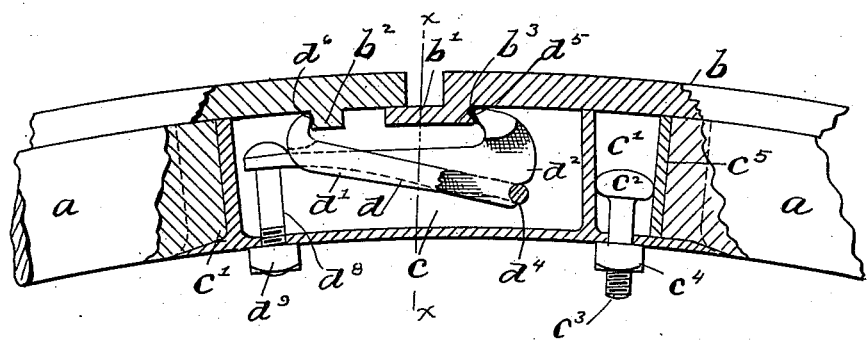
Figure 2:
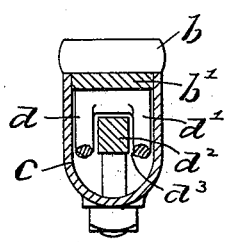
Figure 3:
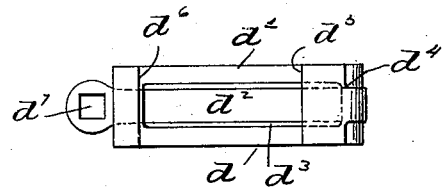
Figure 4:
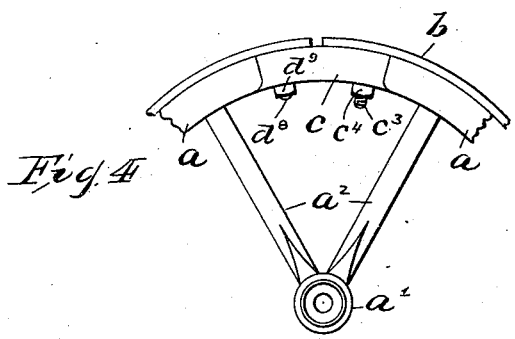

In the accompanying drawings, Figure 1 is a longitudinal sectional view of a device embodying my invention. Fig. 2 is a transverse section on the line $x$ $x$ in Fig. 1. Fig. 3 is a top view of the compound lever. Fig. 4 is a side view of a vehicle-wheel to which my invention has been applied.

Like parts are represented by similar letters of reference.

In the said drawings, $a$ represents the felly of an ordinary vehicle-wheel, which is connected in the usual way to a hub $a'$ by spokes $a^2$.

$b$ is a tire which is adapted to encircle the felly. Located within the felly and adapted to form a part thereof is a casing or chamber $c$, having at each end socket-openings $c'$, into which the ends of adjacent sections of the felly are adapted to be inserted. Adjacent to the chamber $c$ the respective ends of the tire $b$ meet, the tire being formed of a single piece of metal, the ends of which are not rigidly united. One end of the tire $b$ is provided with an offset $b'$, on which the other end is adapted to rest, and each end is provided with projecting lugs $b^2$ $b^3$, which extend into the chamber $c$. Located within the chamber and adapted to engage these lugs $b^2$ $b^3$ is a compound lever $d$, formed of two parts $d'$ $d^2$, one of which $d'$ is slotted to receive the other part $d^2$, which is adapted to pass through the slotted opening $d^3$ therein. The lever $d^2$ is fulcrumed at the end $d^4$ of the slotted opening $d^3$ in the lever $d'$. The engaging ends $d^5$ $d^6$ of these levers are preferably slightly hook-shaped to engage the lugs $b^2$ $b^3$, which are also preferably formed with a bearing-seat slightly concave to receive the ends of said levers. The opposite end of the lever $d^2$ is perforated, as shown at $d^7$, to receive a bolt $d^8$, which extends through the casing $c$ and is provided with a nut $d^9$. By turning the nut $d^9$ so as to draw the end of the lever $d^2$ toward the center of the wheel, the compound lever $d$ is caused to exert a pressure on the respective lugs so as to draw the ends of the tire $b$ together and thus tighten the same on the vehicle-felly.

To further provide for tightening the felly onto the spokes and thus tighten up the wheel when desired, I provide in one of the end sockets $c'$ of the casing $c$ an adjustable block $c^2$, having a screw-threaded stem $c^3$, with a nut $c^4$ thereon. This block $c^2$ bears at one end against the end of the chamber or casing $c$, and at the other against the end of the felly which is inserted into the socket; a wearing plate $c^5$ being preferably employed at the end of the felly-section. The respective bearing-surfaces against which the ends of the block rest are formed on radial lines from the center of the wheel so that tapered sides are presented to the bearing-block. When the tire is first placed on the felly, the bearing-block is at the point nearest the center of the wheel, and in this position the felly is fitted firmly to the spokes. In case the spokes should become loosened, the bearing-block $c^2$ is moved to a position farther from the center of the wheel, which will permit the felly-sections to be drawn closer together. By tightening the tire through the medium of the compound lever the felly will be shrunk so as to take up the slack produced by the adjustment of the bearing-block $c^2$. The felly, by tightening the tire thereon, may thus be tightened onto the spokes and the wheel tightened up without cutting or changing any of the parts thereof.

Having thus described my invention, I claim—

1. The combination with a wheel-felly, and a casing or chamber forming a part thereof, a divided tire on said felly with the adjacent ends opposite said casing, a compound lever within said casing composed of two parts, each of which is adapted to engage one end of said tire, the said lever parts having intermeshing portions fulcrumed together, as described, and an adjustable connection from one of said parts, substantially as and for the purpose specified.

2. The combination with a tire having engaging projections, of a compound lever formed of two parts, one of which is slotted to receive the other which is fulcrumed at one end of said slot, hook-shaped ends on said lever to engage said tire projections, and a screw-threaded bolt or stem extending through the felly, and a nut thereon, substantially as specified.

3. The combination with a felly and a tire thereon, of a casing forming part of said felly, and a movable block between the end of said casing and the felly, said block being arranged in a wedge-shaped opening or chamber, and means, substantially as described, for drawing the ends of the tire together to cause the felly to take up the slack produced by the adjustment of said block, substantially as specified.

4. In a vehicle-wheel, a felly, an adjustable block between the ends of said felly and adapted to be moved to or from the center to tighten or loosen said felly, a tire surrounding said felly, the ends of which are united together by an adjustable device by which said tire may be adjusted to fit said felly in any position of adjustment of the adjustable block, substantially as specified.

In testimony whereof I have hereunto set my hand this 11th day of September, A. D. 1895.

FRANKLIN M. CROMER.

Witnesses:
H. H. WILLIAMS,
H. W. STEPHEN.